(12) United States Patent
Akiyama et al.

(10) Patent No.: US 8,920,536 B2
(45) Date of Patent: Dec. 30, 2014

(54) ORE TREATING METHOD, ORE TREATING APPARATUS, IRON MANUFACTURING METHOD, AND IRON AND STEEL MANUFACTURING METHOD

(75) Inventors: Tomohiro Akiyama, Sendai (JP); Yuichi Hata, Sapporo (JP); Sou Hosokai, Sapporo (JP); Xinghe Zhang, Sapporo (JP); Purwanto Hadi, Kurashiki (JP); Junichiro Hayashi, Eniwa (JP); Yoshiaki Kashiwaya, Sapporo (JP); Hiroshi Uesugi, Yokohama (JP)

(73) Assignees: Bio Coke Lab. Ltd., Yokohama (JP); Tomohiro Akiyama, Sendai (JP)

( * ) Notice: Subject to any disclaimer, the term of this patent is extended or adjusted under 35 U.S.C. 154(b) by 839 days.

(21) Appl. No.: 12/441,279

(22) PCT Filed: Sep. 6, 2007

(86) PCT No.: PCT/JP2007/067388
§ 371 (c)(1),
(2), (4) Date: Jun. 17, 2009

(87) PCT Pub. No.: WO2008/032634
PCT Pub. Date: Mar. 20, 2008

(65) Prior Publication Data
US 2010/0031777 A1  Feb. 11, 2010

(30) Foreign Application Priority Data

Sep. 15, 2006  (JP) .................................. 2006-250875
May 24, 2007  (JP) .................................. 2007-138343

(51) Int. Cl.
*C21B 15/00* (2006.01)
*C22B 13/00* (2006.01)
(Continued)

(52) U.S. Cl.
CPC . *C22B 1/00* (2013.01); *C10B 53/02* (2013.01); *C22B 5/10* (2013.01);
(Continued)

(58) Field of Classification Search
None
See application file for complete search history.

(56) References Cited

U.S. PATENT DOCUMENTS

| | | | |
|---|---|---|---|
| 1,565,689 A | | 12/1925 | Van Slyke |
| 1,941,983 A | * | 1/1934 | Gudmundsen .................. 75/469 |
| 2,131,006 A | * | 9/1938 | Dean .............................. 75/322 |

FOREIGN PATENT DOCUMENTS

| | | |
|---|---|---|
| DE | 974681 C | 3/1961 |
| EP | 0 209 149 A1 | 1/1987 |

(Continued)

OTHER PUBLICATIONS

English translation of JP 2003-147419 (2003).*

*Primary Examiner* — Yoshitoshi Takeuchi
(74) *Attorney, Agent, or Firm* — Birch, Stewart, Kolasch & Birch, LLP (57) ABSTRACT

An ore containing crystal water (bond water) is heated to dehydrate the crystal water in the form of water vapor, thereby rendering the ore porous to generate a porous ore. Next, the porous ore is forced into contact with a dry-distilled gas (organic gas) obtained by dry-distillation of an organic substance such as wood and the like or an organic liquid such as tar and the like. An organic compound such as tar and the like contained in the dry-distilled gas or organic liquid adheres to the surface of the porous ore. Next, the porous ore adhered with an organic compound is heated at 500° C. or higher, to generate an ore in which a part of an oxide of an element such as iron and the like contained is reduced by carbon in the organic compound.

5 Claims, 11 Drawing Sheets (51) Int. Cl.
*C22B 5/20* (2006.01)
*C21B 11/10* (2006.01)
*C22B 11/10* (2006.01)
*C10B 53/02* (2006.01)
*C22B 5/10* (2006.01)
*C21B 5/00* (2006.01)
*C22B 1/00* (2006.01)
*C22B 5/12* (2006.01)
*C21B 13/00* (2006.01)
*C21B 13/02* (2006.01)

(52) U.S. Cl.
CPC ............... *C21B 5/008* (2013.01); *Y02E 50/14* (2013.01); *C22B 5/12* (2013.01); *C21B 13/0066* (2013.01); *C21B 13/023* (2013.01); *C21B 5/00* (2013.01); *C21B 5/007* (2013.01)
USPC .................. 75/506; 75/503; 75/433; 75/414; 75/392

(56) References Cited

FOREIGN PATENT DOCUMENTS

| | | | |
|---|---|---|---|
| EP | 1408124 A1 | 4/2004 | |
| JP | 61-253309 A | 11/1986 | |
| JP | 62-20809 A | 1/1987 | |
| JP | 63-7305 A | 1/1988 | |
| JP | 63-130727 A | 6/1988 | |
| JP | 1-247513 A | 10/1989 | |
| JP | 4-99132 A | 3/1992 | |
| JP | 5-214414 A | 8/1993 | |
| JP | 5-33654 A | 12/1993 | |
| JP | 2001-327861 A | 11/2001 | |
| JP | 2003-147419 | * 5/2003 | ................ C21B 5/00 |
| JP | 2003-147419 A | 5/2003 | |
| JP | 2005-336231 A | 12/2005 | |

* cited by examiner

FIG. 2

| ORE | CONTENT (%) | | BET SPECIFIC SURFACE AREA (m/g)² | | |
|---|---|---|---|---|---|
| | IRON | CRYSTAL WATER | BEFORE DEHYDRATION | AFTER DEHYDRATION | AFTER ADHESION WITH ORGANIC COMPOUND |
| ORE C | 67.6 | 1.59 | 1.93 | 3.73 | 2.82 |
| ORE H | 56.9 | 3.79 | 4.05 | 21.18 | 8.96 |
| ORE R | 57.2 | 9.02 | 16.58 | 45.65 | 17.27 |

ORE TREATING METHOD, ORE TREATING APPARATUS, IRON MANUFACTURING METHOD, AND IRON AND STEEL MANUFACTURING METHOD

This application is the National Phase of PCT/JP2007/067388 filed on Sep. 6, 2007, which claims priority under 35 U.S.C. 119(a) to Patent Application Nos. 2006-250875 and 2007-138343 filed in JAPAN on Sep. 15, 2006 and May 24, 2007, respectively, all of which are hereby expressly incorporated by reference into the present application.

BACKGROUND OF THE INVENTION

1. Field of the Invention

The present invention relates to a method of treating ore for improving the quality of an ore containing an oxide of a useful element, and particularly, to an ore treating method for treating an ore used in iron and steel manufacturing, an ore treating apparatus, an iron manufacturing method, and an iron and steel manufacturing method.

2. Description of Related Art

A process of producing pig iron from iron ore using a blast furnace is a process often used in an iron manufacturing method. A blast furnace is a structure nearly in the form of cylinder having an internal surface constituted of a refractory body, and in operation of a blast furnace, iron ore and coke as raw materials are charged in the form of layer from an upper part thereof and air heated at high temperature is blown through a blast tuyere provided at a lower part of the blast furnace. In blowing air through a blast tuyere, powdered coal is simultaneously blown in many cases. Iron oxide contained in iron ore is reduced over a long period of time by carbon monoxide generated by combustion of coke and powdered coal and gasification with carbon dioxide and melted, to give a hot metal which is then discharged from a lower part of the blast furnace. Though carbon contained in coke and powdered coal acts as a reducing agent, the distance between carbon and iron oxide is in the order of several centimeters and thus a direct reduction as an inter-solid reaction of carbon and iron oxide does not occur in the blast furnace, resulting mainly in an indirect reduction with a carbon monoxide gas. As described above, the current iron manufacturing industry utilizes, as carbon sources, coke and powdered coal derived from mineral coal as a fossil resource.

On the other hand, there is sought utilization of organic wastes or biomass resources for suppressing consumption of fossil resources from the standpoint of prevention of global warming-up. The biomass resources include organic substances derived from living organisms excluding fossil resources and have a so-called carbon neutral feature wherein the discharge amount of carbon dioxide including a combination of two stages of production and consumption is approximately zero. A trial is made in which these organic wastes or biomass resources are dry-distilled and a gas generated by dry distillation is utilized as an energy source. There is a problem, however, in which the produced gas includes organic compounds such as tar and the like which are liquid of high viscosity at normal temperature, and, in cooling of the gas, the organic compounds such as tar and the like liquefy and adhere to internal surfaces of the furnace, piping and the like, thereby generating a gas continuously. Japanese Patent Application Laid-Open (JP-A) No. 2001-327861 discloses a technology of adsorbing tar onto a ceramic containing alumina, silicon dioxide and the like as a component, for removing tar components from a gas.

SUMMARY OF THE INVENTION

Recently, there are a decrease in the proportion of good hematite ore of high quality and an increase in the proportion of limonite ore containing a significant amount of crystal water in veinstone components, as the iron ore to be used as a raw material for iron manufacturing. When an iron ore of low quality is used as a raw material, reduction of iron oxide takes a long time and the amount of consumption of coke as a reducing agent increases. Thus, a development of a technology for treating such an iron ore of low quality and utilizing this effectively in iron manufacturing is pressingly needed.

The present invention has been accomplished in view of such conditions and has an object of providing an ore treating method which is capable of improving an ore so that reduction of an oxide can be carried out more easily by making carbon and an oxide of a useful element to approach.

Another object of the present invention is to provide an ore treating method by which even a low quality ore containing bond water can be improved so as to give easy utilization, by performing a treatment so that an oxide in an ore is easily reduced, by utilizing bond water such as crystal water and the like contained in the ore.

Still another object of the present invention is to provide an ore treating method and an ore treating apparatus by which organic substances are effectively utilized and the amount of consumption of fossil resources can be suppressed, by utilizing organic substances such as organic wastes, biomass resources and the like as a carbon source for reducing an oxide contained in the ore.

Still another object of the present invention is to provide an ore treating method by which even an ore of low quality can be improved so as to give easier utilization, by partially reducing an oxide of a useful element contained in the ore by an easy method.

Further another object of the present invention is to provide an ore treating method, iron manufacturing method and iron and steel manufacturing method by which energy and reducing agent consumption amount necessary for smelting can be decreased, by using an ore so treated as to give easier reduction of an oxide in smelting of useful elements such as iron manufacturing, steel manufacturing and the like.

An ore treating method according to the first invention is characterized by comprising forcing an organic liquid or organic gas containing an organic compound into contact with a porous ore containing an oxide of a specific element, to allow the organic compound to adhere to the above-described porous ore.

An ore treating method according to the second invention is characterized in that the porous ore is produced by heating an ore containing bond water to dehydrate the bond water in the form of water vapor.

An ore treating method according to the third invention is characterized by comprising dry-distilling an organic substance to produce the above-described organic gas.

An ore treating method according to the fourth invention is characterized by comprising heating the above-described porous ore adhered with an organic compound in a temperature range of 500° C. or higher, to reduce the oxide contained in the above-described porous ore.

An ore treating method according to the fifth invention is characterized in that the above-described porous ore contains an oxide of iron.

An ore treating method according to the sixth invention is characterized in that the above-described porous ore contains an oxide of at least one element among Al, Si, Ti, Cr, Mn, Ni, Pb, W, V, Nb and Mo.

An ore treating apparatus according to the seventh invention is characterized by comprising a means for dry-distilling an organic substance and a means for forcing a dry-distilled gas obtained by the above-described means into contact with a porous ore containing an oxide of a specific element.

An iron manufacturing method according to an eighth invention is an iron manufacturing method for producing pig iron using a blast furnace, characterized in that a porous ore treated by the ore treating method according to the fifth invention is blown into a blast furnace through a blast tuyere.

An iron and steel manufacturing method according to the ninth invention is an iron and steel manufacturing method using an iron manufacturing furnace and/or steel manufacturing furnace, characterized in that a sintered ore or pellet for iron and steel manufacturing is produced using, as a raw material, a porous ore treated by the ore treating method according to the fifth invention, and the produced sintered ore or pellet is charged, as a raw material for iron and steel manufacturing, into an iron manufacturing furnace and/or steel manufacturing furnace.

In the first invention, an organic liquid such as coal tar and the like containing a liquid organic compound or an organic gas containing a vaporized organic compound such as tar and the like is forced into contact with a porous ore containing an oxide of a specific useful element, and by this operation, the organic compound forced into contact with surfaces including surfaces in pores of the porous ore reacts, leading to adhering of the organic compound to the surface of the porous ore.

In the second invention, an ore containing bond water such as crystal water and the like is heated, and by this operation, the bond water is dehydrated in the form of water vapor, and the route of water vapor dehydrated from the inside to the outside of the ore forms pores, thereby rendering the ore porous, producing a porous ore.

In the third and seventh inventions, an organic waste or an organic substance such as biomass resources and the like is dry-distilled, and by this operation, an organic gas containing a vaporized organic compound such as tar and the like is generated, and the organic compound is adhered to porous ore.

In the fourth invention, a porous ore adhered with an organic compound such as tar and the like is heated in a temperature range of 500° C. or higher, and by this operation, a reduction reaction occurs between an oxide contained in the ore and carbon contained in the organic compound which are mutually closely adjacent, leading to reduction of the oxide.

In the fifth and ninth inventions, the porous ore is an ore containing iron oxide, and the porous ore after treatment can be processed into a sintered ore or pellet and utilized as a raw material for iron and steel manufacturing.

In the sixth invention, the porous ore is an ore containing an oxide of at least one element among Al, Si, Ti, Cr, Mn, Ni, Pb, W, V, Nb and Mo as useful elements, and can be utilized as a raw material for smelting of these useful elements.

In the eighth invention, the porous ore adhered with an organic compound such as tar and the like is blown through a blast tuyere of a blast furnace, and by this operation, carbon contained in the organic compound acts as a reducing agent in the blast furnace.

In the first invention, an organic compound such as tar and the like adheres to a porous ore containing an oxide of specific useful element, and by that, an oxide contained in the ore and carbon contained in the organic compound come into close proximity. Thus, it becomes possible to reduce more easily an oxide contained in an ore, and it becomes possible to improve even an ore of low quality containing a significant amount of veinstone components so as to give easier utilization as a raw material for smelting.

The second invention is capable of producing a porous ore obtained by rendering an ore containing bond water such as crystal water and the like porous, and further producing a porous ore adhered with an organic compound such as tar and the like. Therefore, it becomes possible to improve even an ore of low quality containing bond water so as to give easier utilization as a raw material for smelting.

In the third and seventh inventions, an organic compound such as tar and the like contained in a dry-distilled gas obtained by dry-distilling an organic substance is forced into contact with a porous ore, and by this operation, the organic substance can be utilized effectively. Particularly, in the case of utilization of an organic waste or biomass resource as the organic substance, it becomes possible to suppress consumption of a fossil resource necessary in a process of smelting of a useful element such as iron manufacturing and the like.

In the fourth invention, by heating a porous ore adhered with an organic compound such as tar and the like at 500° C. or higher, an oxide contained in the ore can be partially reduced easily. Therefore, it becomes possible to improve even an ore of low quality so that the amount of consumption of a reducing agent and energy necessary for reduction of an oxide in smelting can be reduced.

In the fifth and ninth inventions, a porous ore reduced by the ore treating method of the present invention is utilized as a raw material for iron and steel manufacturing, and by that, the amount of consumption of a reducing agent and energy necessary for producing pig iron or steel by reducing an ore can be reduced. Further, a porous ore adhered with an organic compound such as tar and the like according to the ore treating method of the present invention is utilized as a raw material for iron and steel manufacturing, and by that, iron oxide is reduced easily, and the amount of consumption of a reducing agent and energy necessary for producing pig iron and steel by reducing an ore can be reduced.

In the sixth invention, an ore containing an oxide of Al, Si, Ti, Cr, Mn, Ni, Pb, W, V, Nb, Mo or the like as useful elements is treated by the ore treating method of the present invention and the ore after the treatment is utilized as a raw material in smelting of Al, Si, Ti, Cr, Mn, Ni, Pb, W, V, Nb, Mo or the like, and by that, the amount of consumption of a reducing agent and energy necessary for smelting can be reduced.

In the eighth invention, the amount of consumption of a reducing agent such as coke, powdered coal or the like utilized in a process of iron manufacturing using a blast furnace can be reduced since carbon contained in an organic compound such as tar and the like adhered to a porous ore acts as a reducing agent, thus, the present invention performs excellent effects.

DESCRIPTION OF THE PREFERRED EMBODIMENTS

The present invention will be illustrated below specifically based on drawings showing embodiments thereof.
(Ore Treating Method)

Figure 1:
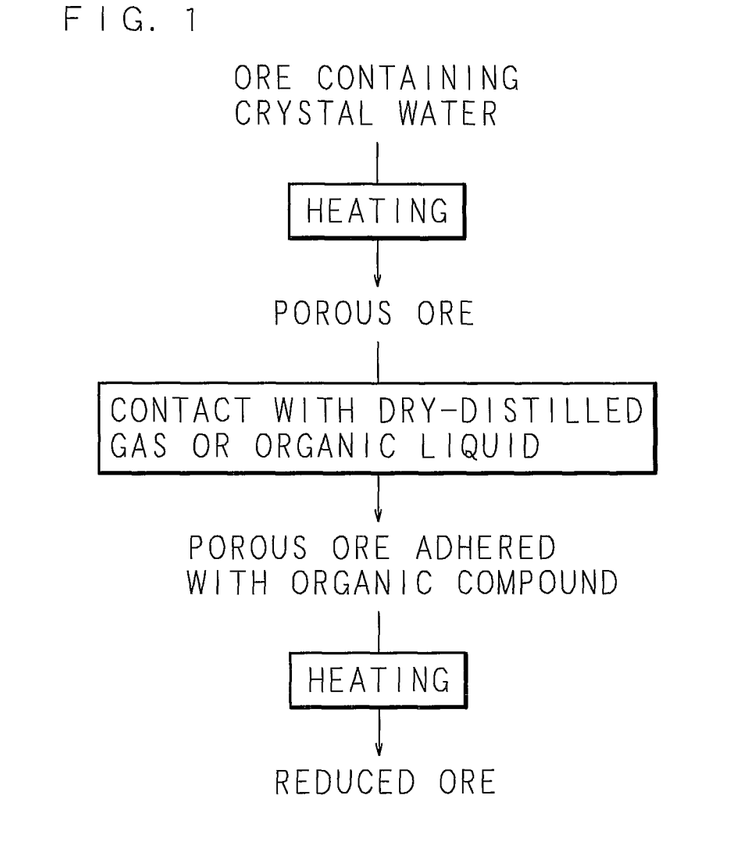
FIG. 1 is a conceptual view showing the procedure of the ore treating method of the present invention.

FIG. 1 is a conceptual view showing the procedure of the ore treating method of the present invention. In the present invention, first, an ore containing crystal water is heated and the crystal water is dehydrated in the form of water vapor, thereby rendering the ore porous to produce a porous ore. It is desirable that an ore containing crystal water is previously processed into fine particle or powder. In the present invention, next, a porous ore is forced into contact with a dry-distilled gas prepared by dry-distilling an organic substance such as a biomass resource or the like, or with an organic liquid such as coal tar or the like. The dry-distilled gas contains a vaporized organic compound such as tar or the like, and when a porous ore is forced into contact with the dry-distilled gas, the organic compound in contact with the surface of the porous pore is liquefied or solidified, and adhered to the surface of the porous ore. When a porous ore is forced into contact with an organic liquid, the organic liquid permeates into the porous ore, and the organic compound contained in the organic liquid adheres to the surface of the porous ore. Thus, a porous ore adhered with an organic compound such as tar or the like is generated. In the present invention, next, a porous ore adhered with an organic compound is heated under an inert atmosphere, to generate an ore in which an oxide of a useful element contained has been reduced by carbon in the organic compound.

Figure 2:
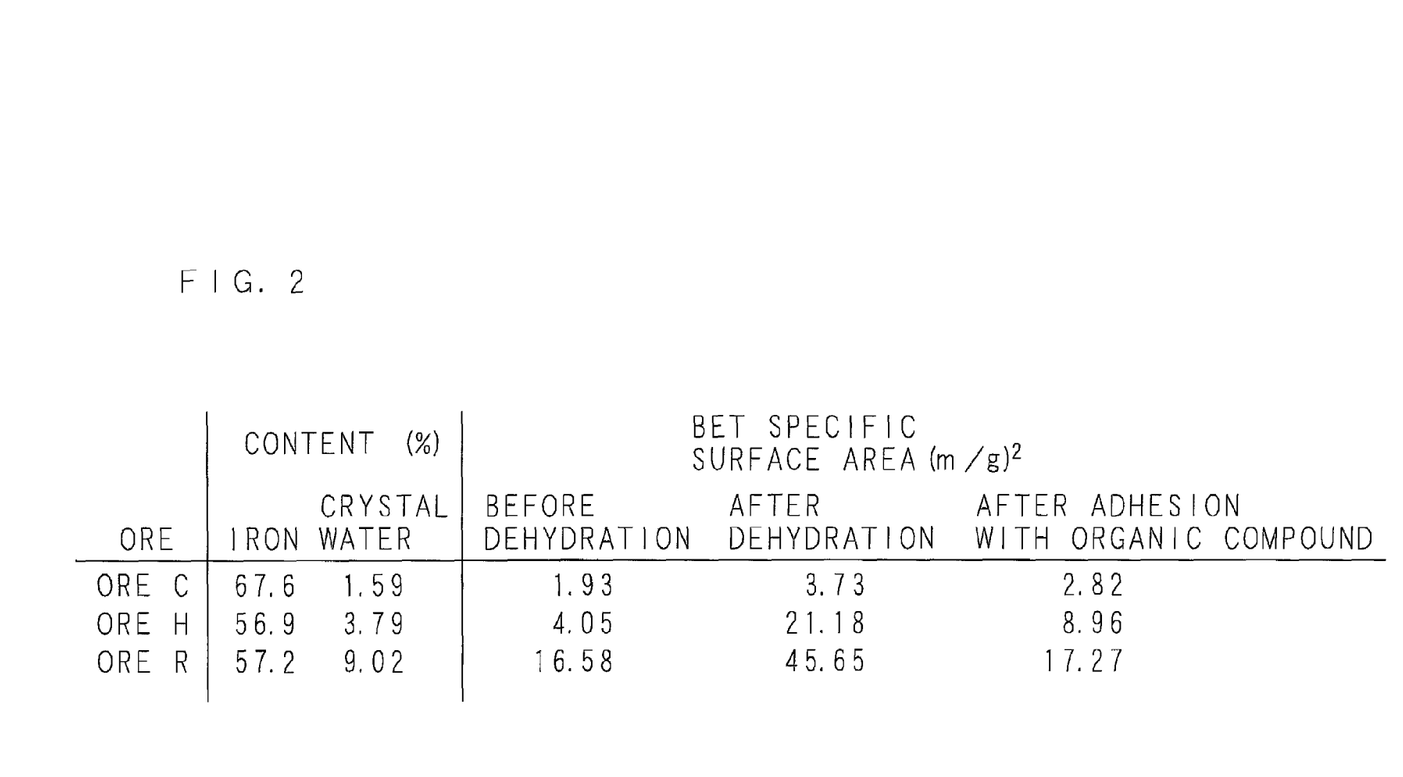
FIG. 2 is a diagram showing ores treated in examples.

The present invention will be illustrated in detail below using examples of treating specific ores. FIG. 2 is a diagram showing ores treated in examples. Ore C is a good iron ore containing iron in a proportion of 60% or more. Ore H and ore R are limonite ores and contain gibbsite and goethite, and both of them are iron ores of low quality having an iron content of 60% or less and containing crystal water in a proportion of 3% or more. FIG. 2 shows BET specific surface areas of ores, together with the contents of iron and crystal water. All the ores are in the form of powder.

Ore C, ore H and ore R were heated at 450° C. in atmosphere, thereby rendering the ores porous to generate porous ores. In this process of generating porous ores, it is necessary to dehydrate crystal water in the ore, leading to a necessity of heating at 250° C. or higher. FIG. 3 is a schematic cross-sectional view showing a generation process of a porous ore. In the figure, the cross-section of a particle of an ore is shown.

Figure 3A:
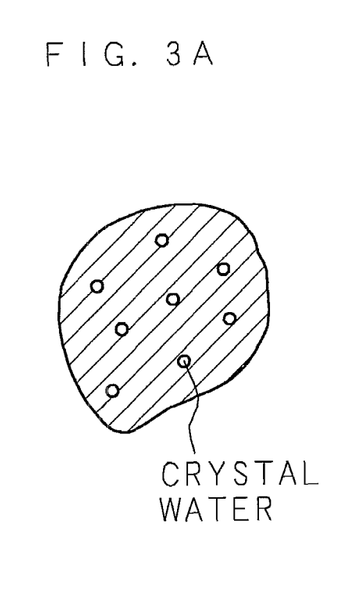
FIG. 3 is a schematic cross-sectional view showing a generation process of a porous ore.
Figure 3B:
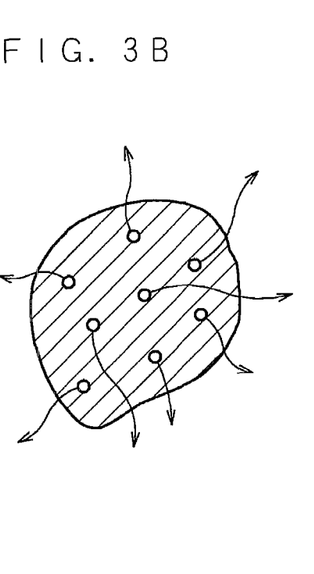
Figure 3C:
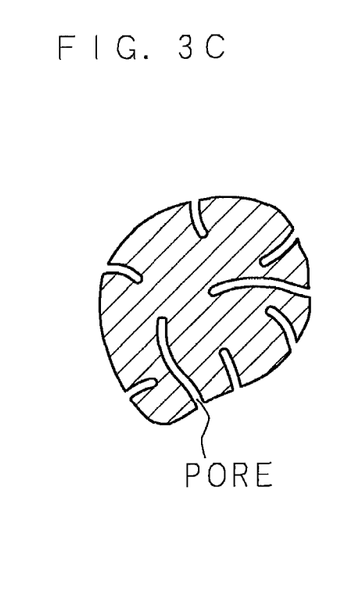

FIG. 3A shows an ore before heating, and crystal water is contained in the ore. FIG. 3B shows an ore during heating. By heating, crystal water is separated from the crystal of the ore, and dehydrated in the form of water vapor. FIG. 3C shows an ore after heating. The route of water vapor dehydrated from the inside to the outside of the ore forms pores, generating a porous ore. As shown in FIG. 2, all the pores manifested an increase in the BET specific surface area after dehydration as compared with that before dehydration. In particular, the increase in the BET specific surface area is remarkable in ore R containing a larger amount of crystal water. The example of crystal water is shown in this example, however, even if an ore contains bond water other than crystal water, it is possible to dehydrate the bond water in the ore to generate a porous ore according to the same procedure.

Figure 4:
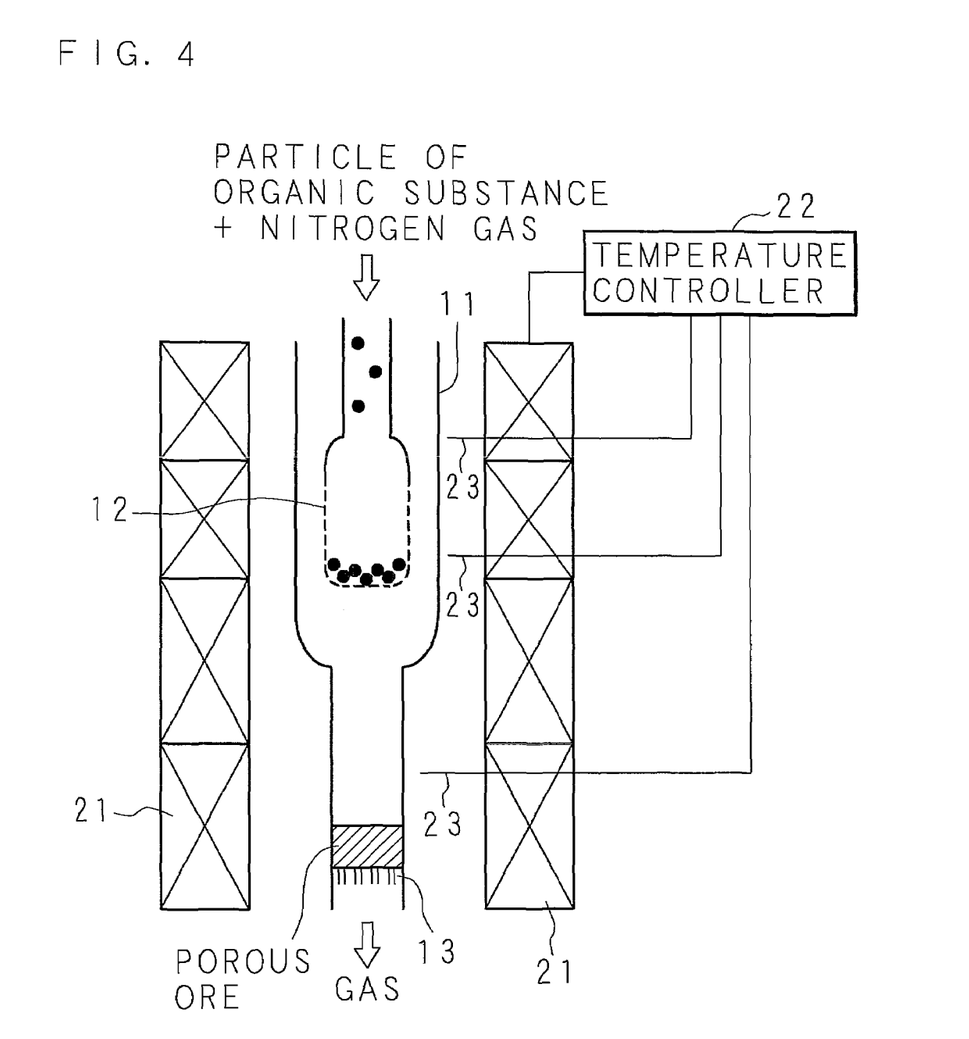
FIG. 4 is a schematic view showing a part of an experimental apparatus used in an experiment of adhering an organic compound to a porous ore using a dry-distilled gas.

Next, a treatment was carried out for allowing an organic compound to adhere to porous ores. A treatment example is shown in which a dry-distilled gas of an organic substance is forced into contact with a porous ore, thereby adhering an organic compound to the porous ore. FIG. 4 is a schematic view showing a part of an experimental apparatus used in an experiment of adhering an organic compound to a porous ore using a dry-distilled gas. It has a constitution in which particles of an organic substance and a nitrogen gas flow in from one end of a reaction tube 11, and a gas flows out from another end thereof. In this constitution, wire mesh 12 is provided in the reaction tube 11, and the inflown particles of an organic substance are accumulated on the wire mesh 12. Further, a dispersion plate 13 is provided below the wire mesh 12 in the reaction tube 11, and a powder of a porous ore is filled in the dispersion plate 13. The reaction tube 11 is set in an electric furnace 21, and equipped with thermo couples 23, 23, . . . for measuring the temperatures of several parts of the reaction tube 11. Thermo couples 23, 23, . . . are connected to a temperature controller 22, and the temperature controller 22 has a constitution in which the temperatures of several parts of the reaction tube 11 are measured using the thermo couples 23, 23, . . . , and the operation of the electric furnace 21 is controlled so as to give predefined temperatures of several parts of the reaction 11.

In the reaction tube 11, a nitrogen gas flows passing through particles of an organic substance accumulated on the wire mesh 12, the wire mesh 12, a porous ore filled on the dispersion plate 13, and the dispersion plate 13. By heating the particles of an organic substance by the electric furnace 21, the organic substance is dry-distilled to generate a dry-distilled gas, and the generated dry-distilled gas permeates into the powder of the porous ore owing to the flow of a nitrogen gas, before flowing out of the reaction tube 11. In the experiment, pine sawdust was used as the organic substance, and the pine sawdust was charged at a rate of 0.07 g/min, and the pine sawdust was heated at 600° C. to generate a dry-distilled gas, and the dry-distilled gas was allowed to flow for 40 minutes through 3.0 g of the porous ore kept at 500° C. It is necessary that the temperature of the porous ore is kept at a temperature lower than the temperature of the dry-distilled gas.

Figures 5A, 5B:
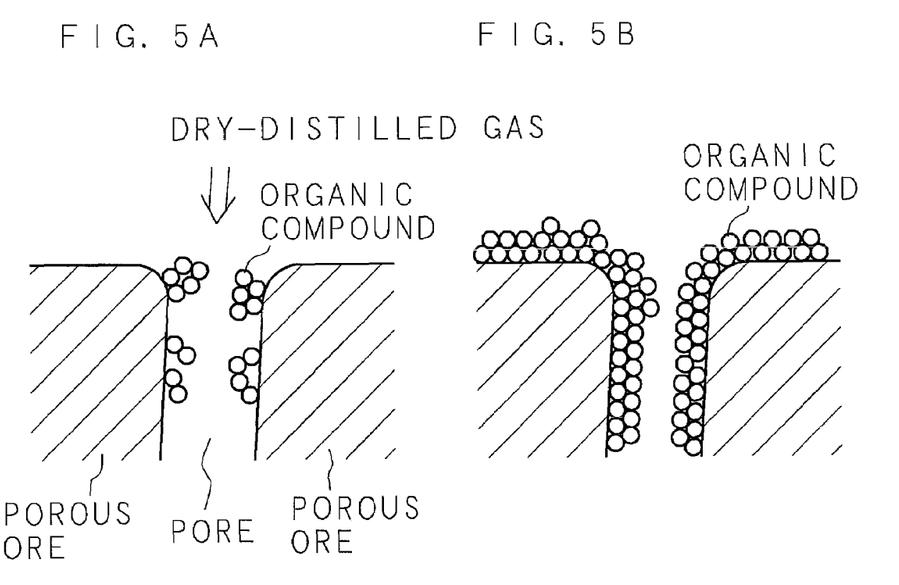
FIG. 5 is a schematic view showing schematically a process of adhering an organic compound to a porous ore.

FIG. 5 is a schematic view showing schematically a process of adhering an organic compound to a porous ore. In the figure, the surface of a porous ore having pores is shown. A dry-distilled gas obtained by dry-distilling an organic substance contains a vaporized organic compound such as tar and the like. As shown in FIG. 6A, when a dry-distilled gas is forced into contact with the surface of a porous ore, a part of an organic compound in contact with the surface of a porous ore is liquefied or solidified, and adhered to the surface of a porous ore. The organic compound contained in the dry-distilled gas adheres to surfaces including surfaces in pores, and a porous ore carrying the organic compound adhered widely to the surface thereof is generated, as shown in FIG. 5B.

Figure 6:
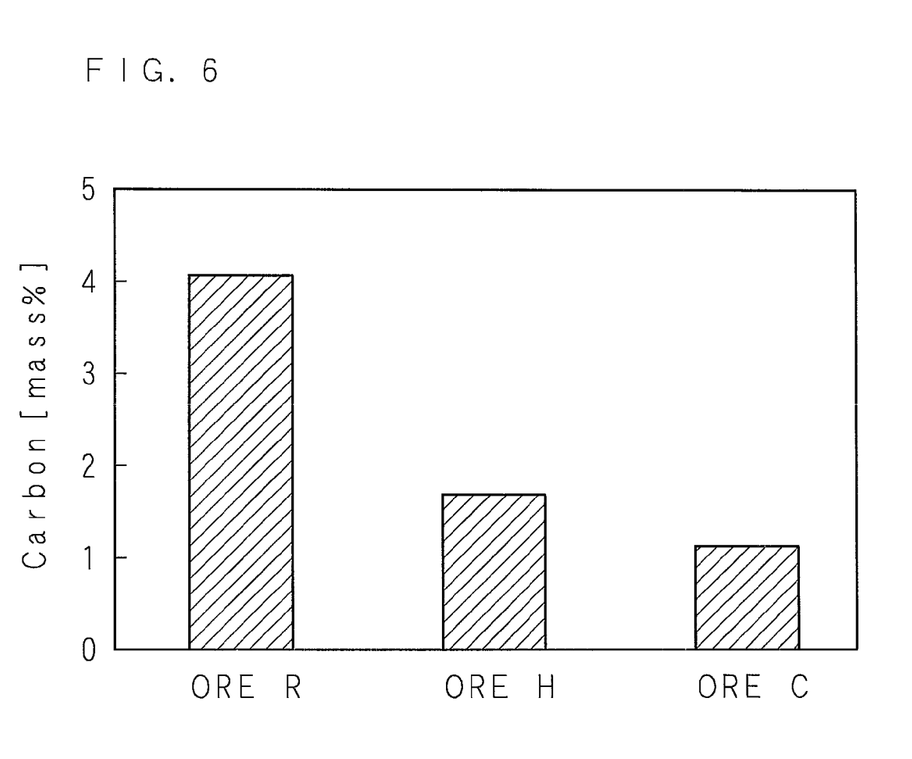
FIG. 6 is a characteristic view showing the carbon content of an organic compound adhered to a porous ore.

The porous ore treated using the experimental apparatus shown in FIG. 4 was heated up to 900° C. in an inert atmosphere for evaluation of a reducing property and subjected to TG-DTA analysis, and chemical analysis, XRD analysis and measurements of specific surface area and pore diameter distribution were carried out. As shown in FIG. 2, a decrease in the BET specific surface are after adhesion of an organic compound was measured. FIG. 6 is a characteristic view showing the carbon content of an organic compound adhered to a porous ore. In the figure, the ordinate shows the content of carbon contained in a porous ore adhered with an organic compound. In ore R, an organic compound adheres remarkably because of large surface area, and in the experiment, 4.04% of carbon adheres. This carbon amount is about the half of the carbon minimum necessary amount (9.22%) for completely reducing iron oxide contained in the ore R. The content of carbon contained in a porous ore adhered with an organic compound can be controlled by adjusting the time for contact of the porous ore with a dry-distilled gas. The porous ore adhered with an organic compound has internal surfaces and outer surfaces discolored to black, and shows low caking property at room temperature.

Figure 7:
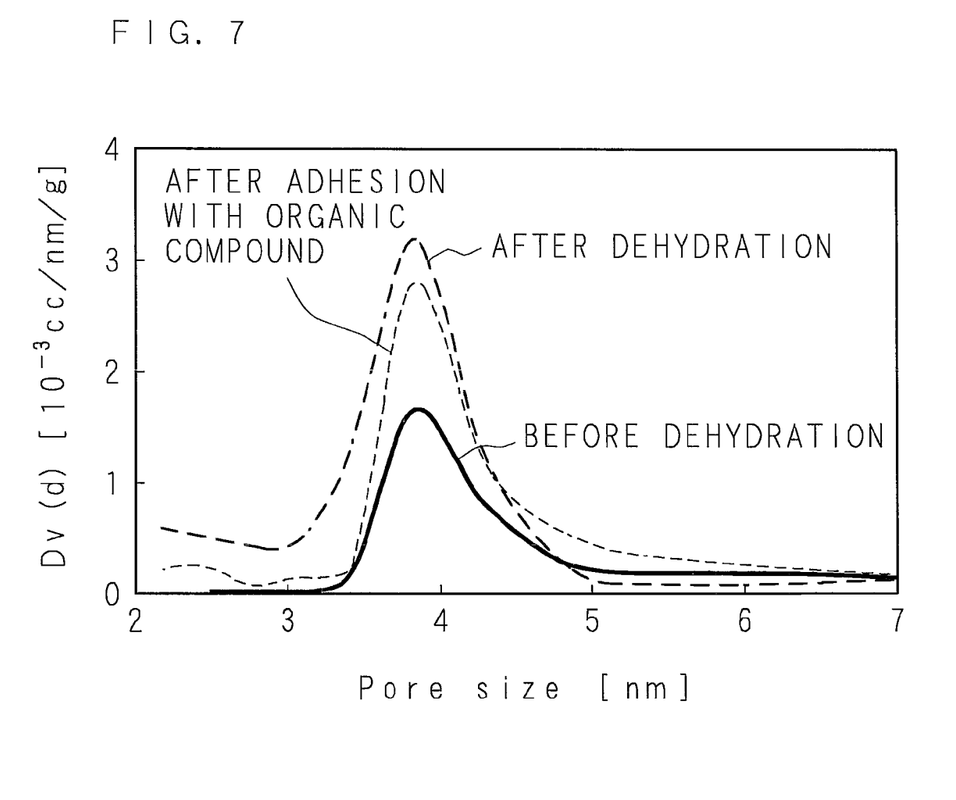
FIG. 7 is a characteristic view showing the results of measurement of pore diameter distribution of ore R.

FIG. 7 is a characteristic view showing the results of measurement of pore diameter distribution of ore R. In the figure, the abscissa denotes pore diameter, and the ordinate denotes the proportion of the content volume of a pore of each diameter. FIG. 7 shows pore diameter distributions before dehydration of ore R, after dehydration thereof, and after adhesion of an organic compound, and the average pore diameter was 4 nm in all cases. It is clear that the pore of each diameter increases significantly by the dehydration treatment. Further, since the proportion of pores of 4 nm or less decreases by adhesion of an organic compound, it is estimated that the organic compound adheres preferentially to pores having a pore diameter of 4 nm or less. This suggests that the size of a molecule of the organic compound adhered is in the order of sub-nanometer smaller by one digit than the pore diameter, and the molecule of the organic compound collides efficiently to the wall of a pore having single nanometer diameter.

Next, the porous ore adhered with an organic compound using a dry-distilled gas was subjected to a treatment of reduction by heating. Ore R adhere with an organic compound was heated at 500° C. or higher under an inert atmosphere. It was observed that the weight of ore R decreases at temperatures of 500° C. or higher. Usually, gas reduction of iron oxide occurs only at temperatures of 800° C. or higher, however, iron oxide contained in an ore and carbon contained in an organic compound such as tar and the like are in close proximity at the order of nanometer in a porous ore adhered with an organic compound, thus, it is estimated that direction reduction as an inter-solid (solid-solid reaction) reaction between carbon and iron oxide occurs. When carbon reduces iron oxide, carbon contained in an organic compound is released in the form of carbon dioxide. As a result, in the experiment of this example, a decrease of 12% weight was observed corresponding to a reduction rate of 41%, in the weight of ore R adhered with an organic compound.

In contrast, also an organic liquid can be forced into contact with a porous pore, to adhere an organic compound to the porous ore, in the ore treating method of the present invention, as shown in FIG. 1. Intending adhesion of an organic compound to a porous ore using an organic liquid, the subsequent experiment was carried out. As the organic liquid, various heavy oils generated in a petroleum refining process are used in addition to coal tar. When the viscosity of an organic liquid is high, a solvent for lowering viscosity is added, to enable invasion of the organic liquid into pores.

First, coal tar was charged into a beaker together with a THF (tetrahydrofuran) solvent at room temperature, to prepare a solution having lowered viscosity (tar concentration: 0.20 g/ml). Then, 2.0 g of limonite ore (Robe River ore) made into porous by removing 9.02% of bond water by retaining at 450° C. for 3 hours in atmosphere previously was immersed in the prepared solution for a sufficient period of time. Finally, the THF solution was dried and removed by a rotary evaporator, obtaining a porous ore in which an organic compound adheres to surfaces including surfaces in pores.

Figure 8:
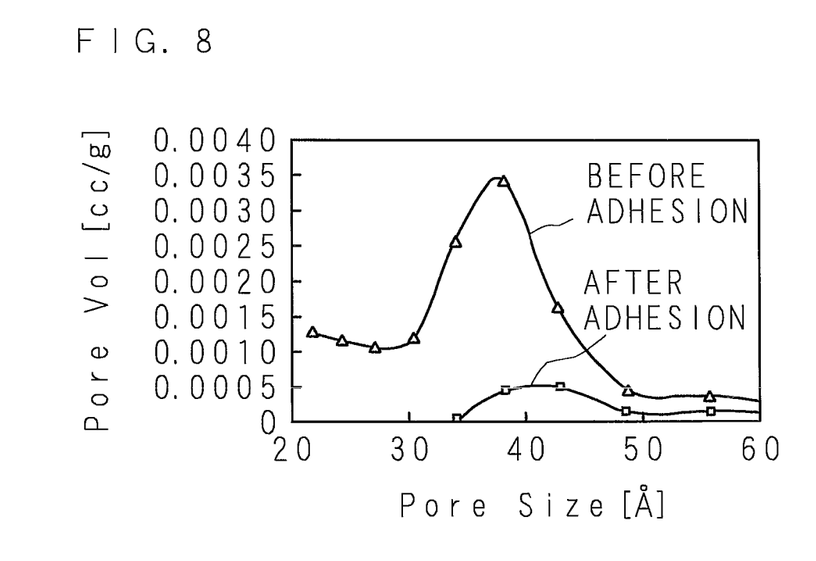
FIG. 8 is a characteristic view showing the results of measurement of pore diameter distribution of a porous ore before and after adhesion of an organic compound.

The mass balance of the resultant porous ore was confirmed before and after adhesion of an organic compound. The resultant results show impregnation of tar (organic compound) of 6.22% by weight into the porous ore, revealing a change in the porous structure of the porous ore. FIG. 8 is a characteristic view showing the results of measurement of pore diameter distribution of a porous ore before and after adhesion of an organic compound. In the figure, the abscissa denotes pore diameter, and the ordinate denotes the volume of a pore of each diameter. By adhesion of an organic compound, the pore volume of the porous ore decreased from 9.060 E-02 cc/g to 1.646 E-02 cc/g, and the specific surface area of the porous ore decreased from 74.90 $m^2$/g to 4.00 $m^2$/g significantly. Because of decreases in the pore volume and the specific surface of the porous ore, it is clear that adhesion of an organic compound contained in the organic liquid onto surfaces in pores provides impregnation of the porous ore with the organic compound.

It is also possible to perform the above-described treatment under a vacuum atmosphere to remove air in pores in the form of bubble, thereby impregnating effectively an organic compound into a porous ore. Also when various heavy oils other than coal tar are used as the organic liquid, an organic compound can be adhered to a porous ore by the same treatment. As the solvent for lowering the viscosity of the organic liquid, it is also possible to use benzene, toluene, xylene, acetone, pyridine or quinoline, instead of THF. When the viscosity of the organic liquid is sufficiently low, it is possible to carry out the treatment for adhering an organic compound in an organic liquid to a porous ore without using a solvent. Also the porous ore thus adhered with an organic compound using an organic liquid can be reduced by heating, in the same manner as for the porous ore adhered with an organic compound using a dry-distilled gas.

As described above, in the present invention, a dry-distilled gas obtained by dry-distilling an organic substance or an organic liquid such as coal tar or the like is forced into contact with a porous ore containing iron oxide, thereby adhering the organic compound such as tar or the like to the porous ore. Further, the porous ore adhered with an organic compound is hated at 500° C. or higher, to reduce iron oxide contained in the porous ore. In the present invention, it is possible to reduce an ore more easily and with a lower energy, as compared with conventional methods such as a method using a smelting furnace, and the like. Further, in the porous ore adhered with an organic compound which can be generated in the present invention, iron oxide contained in the ore and carbon contained in an organic compound such as tar and the like are in close proximity, thus, iron oxide can be reduced more easily when this porous ore is utilized as a raw material for iron and steel manufacturing. Therefore, according to the ore treating method of the present invention, it becomes possible to improve an ore of low quality such as limonite ore or the like containing a large amount of veinstone components and containing crystal water, so as to give easier utilization as a raw material for iron and steel manufacturing.

(Ore Treating Apparatus)

Figure 9:
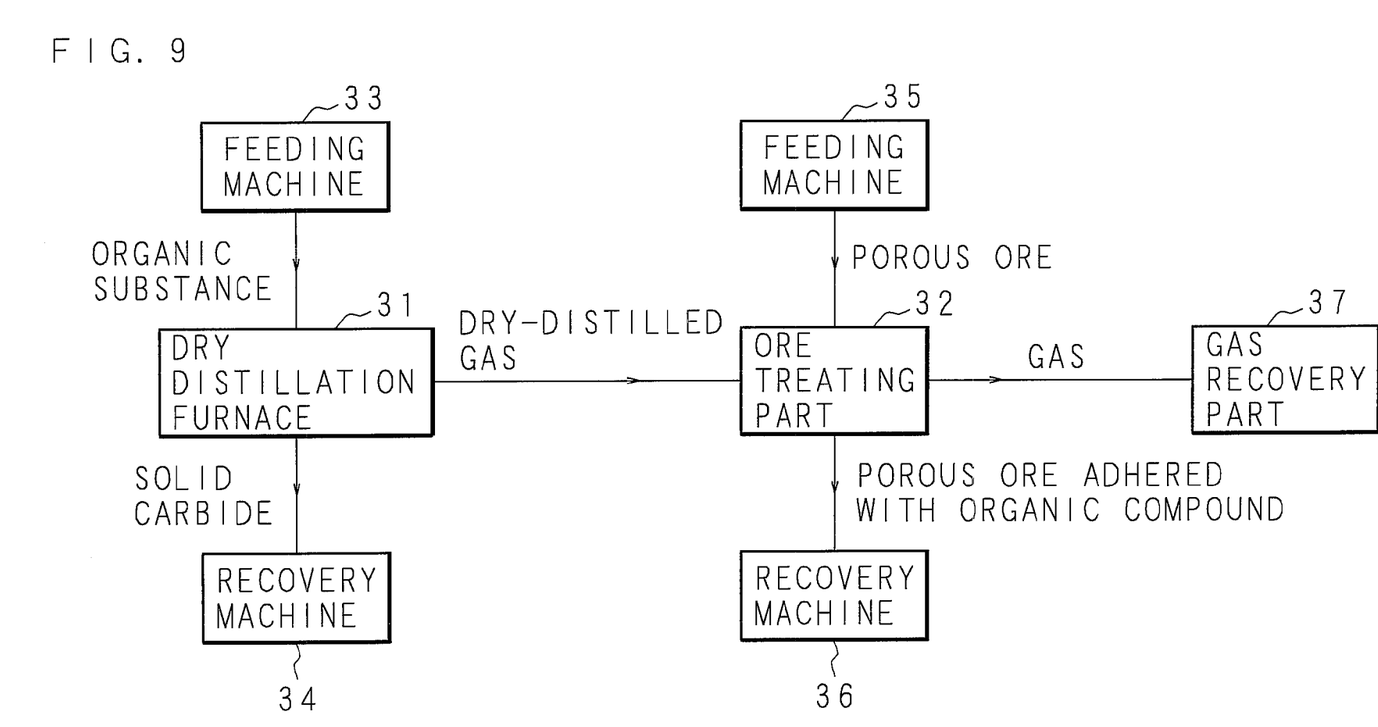
FIG. 9 is a block view showing an example of constitution of the ore treating apparatus of the present invention for generating a porous ore adhered with an organic compound.

FIG. 9 is a block view showing an example of constitution of the ore treating apparatus of the present invention for generating a porous ore adhered with an organic compound. The ore treating apparatus of the present invention has a dry-distilling furnace 31 for dry-distilling an organic substance to generate a dry-distilled gas, and an ore treating part 32 as a reaction vessel which accommodates therein a porous ore and causes adhesion of an organic compound such as tar or the like. The dry-distilling furnace 31 is equipped with a feeding machine 33 for feeding an organic substance, and has a constitution in which an organic substance fed from the feeding machine 33 is heated to generate a dry-distilled gas. As the organic substance to be dry-distilled by the dry-distilling furnace 31, biomass resources such as wood and the like, and organic wastes or asphalt and the like may be used. As the organic substance, mineral coal as a fossil resource, or heavy crude oils such as orimulsion, oil shale, oil sand and the like may also be used. The dry-distilling furnace 31 is equipped with a recovery machine 34 for recovering a solid carbide remaining after dry distillation.

The dry-distilling furnace 31 is connected to an ore treating part 32 via piping, and feeds a dry-distilled gas to the ore treating part 32. The ore treating part 32 is equipped with a feeding machine 35 for feeding a porous ore in the form of fine particle or powder, and has a constitution in which the porous ore fed from the feeding machine 35 is accumulated, the internal temperature is controlled to given value, and a dry-distilled gas from the dry-distilling furnace 31 is forced into contact with the porous ore. Further, the ore treating part 32 has a constitution in which a porous ore from the feeding machine 35 is accumulated in an upper part thereof, and forced into contact with a dry-distilled gas sufficiently to give the porous ore adhered with an organic compound which is then discharged from a lower part thereof. The ore treating part 32 is equipped with a recovery machine 36 for recovering the porous ore adhered with an organic compound. Further, the ore treating part 32 is equipped with a gas recovery part 37 for recovering a gas after contact of a dry-distilled gas with the porous ore.

As described above, the ore treating apparatus of the present invention recovers a porous ore adhered with an organic compound such as tar or the like, a solid carbide, and a gas. The solid carbide and gas can be utilized as a fuel, and the ore treating apparatus may also have a constitution in which the recovered solid carbide and gas are utilized as a fuel for keeping the temperature in the dry-distilling furnace 31 and the ore treating part 32.

Figure 10:
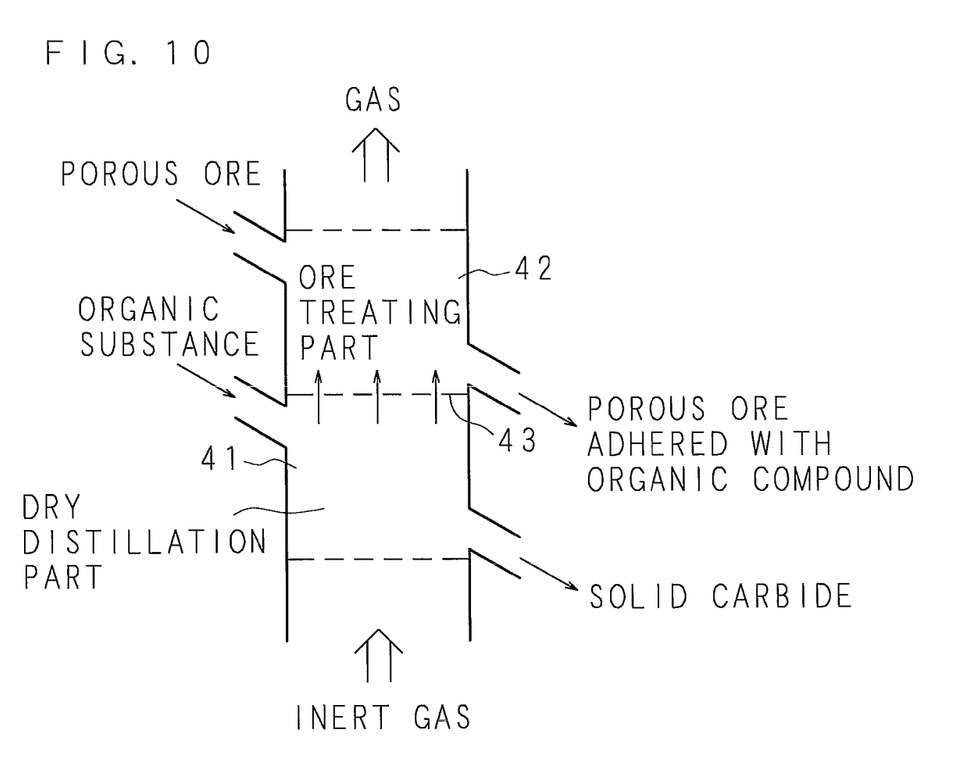
FIG. 10 is a schematic view showing another example of constitution of the ore treating apparatus of the present invention.

FIG. 10 is a schematic view showing another example of constitution of the ore treating apparatus of the present invention. The ore treating apparatus has a dry-distilling part 41 as a reaction vessel for accommodating therein an organic substance, and an ore treating part 42 as a reaction vessel for accommodating therein a porous ore. The dry-distilling part 41 has a constitution in which an organic substance is fed, the organic substance is heated using an electric furnace or the like to generate a dry-distilled gas, and a solid carbide after dry distillation of the organic substance is discharged. A lower part of the dry-distilling part 41 is made in the form of mesh, giving a constitution in which an inert gas is blown from the lower side. The dry-distilling part 41 and the ore treating part 42 are divided by a mesh plate 43, and a dry-distilled gas generated by the dry-distilling part 41 flows into the ore treating part 42 according to the flow of the inert gas blown from the lower side of the dry-distilling part 41.

The ore treating part 42 has a constitution in which a porous ore is fed, and a dry-distilled gas flown from the dry-distilling part 41 is forced into contact with the porous ore fed and accommodated inside, while maintaining a predefined temperature using an electric furnace and the like. An upper part of the dry-distilling part 41 is made in the form of mesh, and the gas after contact of the dry-distilled gas with a porous ore is discharged to the upper side of the ore treating part 42. The ore treating part 42 has a constitution in which a porous ore adhered with an organic compound by sufficient contact with a dry-distilled gas is discharged.

Also by the ore treating apparatus as described above, a porous ore adhered with an organic compound, a solid carbide, and a gas are recovered. Since the distance between the dry-distilling part 41 and the ore treating part 42 is short, an organic compound such as tar or the like contained in the dry-distilled gas generated in the dry-distilling part 41 adheres to a porous ore without loss, and the treating efficiency of the porous ore can be improved. In the above-described example, a dry-distilled gas obtained by dry-distilling an organic substance such as a biomass resource or the like is used as the organic gas for allowing an organic compound to adhere to a porous ore, however, the present invention is not limited to this, and coke furnace discharge gases and the like, and other organic gases may also be used.

(Iron Manufacturing Method and Iron and Steel Manufacturing Method)

Figure 11:
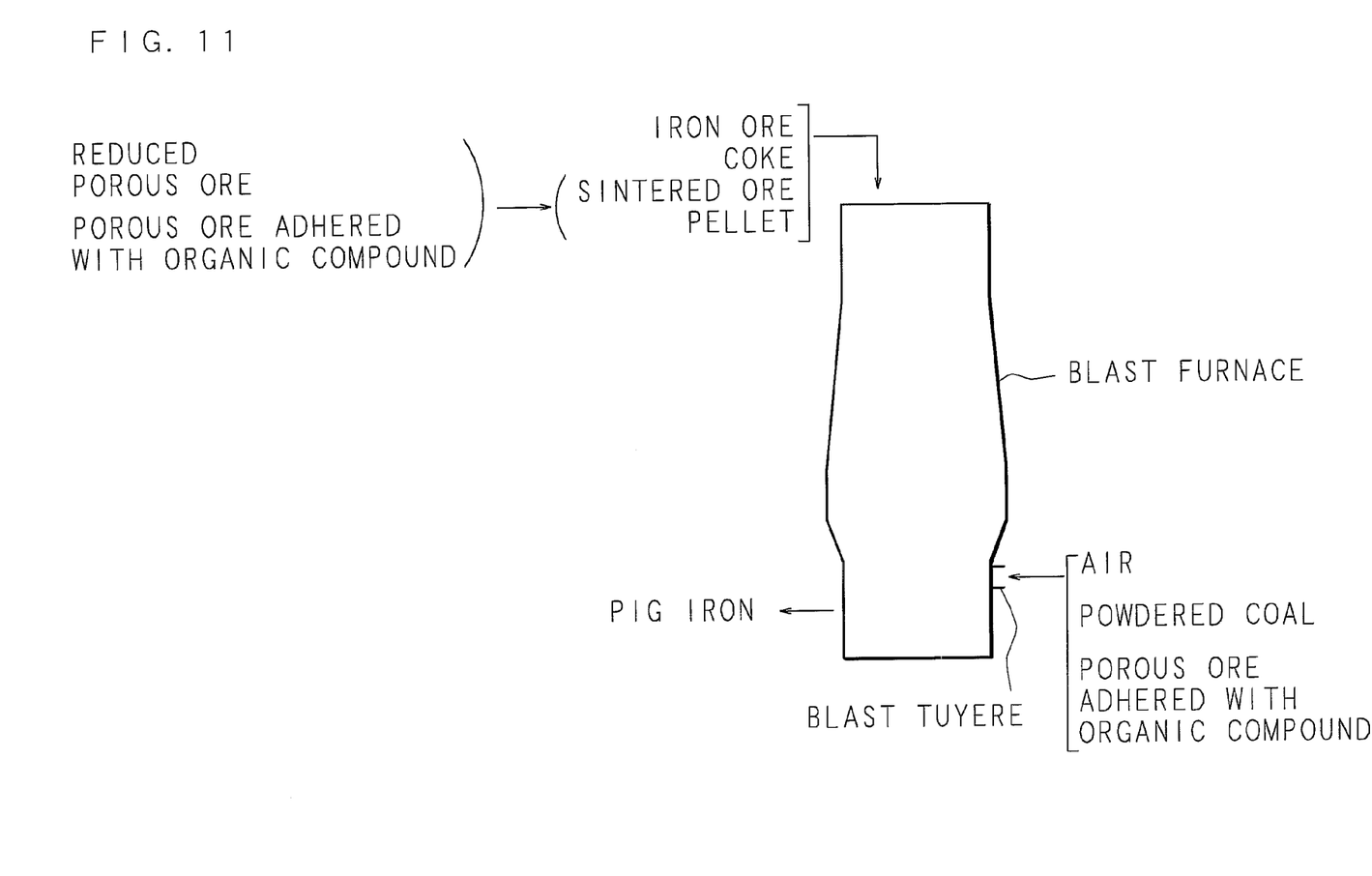
FIG. 11 is a schematic view showing a method of utilizing an ore generated by the ore treating method of the present invention.

FIG. 11 is a schematic view showing a method of utilizing an ore generated by the ore treating method of the present invention. In the figure, a blast furnace for producing pig iron from iron ore is shown, and the blast furnace has a constitution in which iron ore and coke as raw materials are charged from the upper part thereof, air and powdered coal heated at high temperature are blown in through a blast tuyere provided at a lower part thereof, and melted pig iron is discharged from a lower part thereof. The porous ore reduced by the ore treating method of the present invention or the porous ore adhered with an organic compound is in the form of fine particle or powder, and these porous ores are mixed with given materials such as coke, lime stone and the like and sintered, to produce a sintered ore or pellet for iron manufacturing. The ore generated according to the ore treating method of the present invention by charging the sintered ore or pellet produced into a blast furnace together with iron ore and coke is utilized as a raw material for iron manufacturing. The porous ore in the form of powder adhered with an organic compound is blown into a blast furnace through a blast tuyere together with air and powdered coal heated.

The porous ore reduced by the ore treating method of the present invention or the porous ore adhered with an organic compound can be utilized not only as a raw material in an iron manufacturing process using a blast furnace, but also as a raw material in a steel manufacturing process using a steel manufacturing furnace such as an electric furnace, steel converter and the like. In the case of utilization in a steel manufacturing process, the ore generated according to the ore treating method of the present invention by using the porous ore reduced by the ore treating method of the present invention or the porous ore adhered with an organic compound as a raw material to produce a sintered ore or pellet for steel manufacturing, and charging the sintered ore or pellet produced into a steel manufacturing furnace such as an electric furnace, steel converter or the like, is utilized as a raw material for steel manufacturing.

Since the porous ore reduced by the ore treating method of the present invention contains iron oxide reduced to a certain extent, the amount of consumption of a reducing agent and energy necessary for reducing an ore to produce pig iron and steel can be reduced by utilizing this porous ore as a raw material for iron and steel manufacturing. Further, in the porous ore adhered with an organic compound according to the ore treating method of the present invention, iron oxide contained in the ore and carbon contained in an organic compound such as tar and the like are in close proximity, thus, iron oxide is reduced easily and the amount of consumption of a reducing agent and energy necessary for reducing an ore to produce pig iron and steel can be reduced by utilizing this porous ore as a raw material for iron and steel manufacturing.

By blowing a porous ore adhered with an organic compound into a blast furnace through a blast tuyere in an iron manufacturing process, carbon contained in an organic compound such as tar or the like acts as a reducing agent, and the amount of consumption of a reducing agent such as coke, powdered coal or the like utilized ion iron manufacturing can be decreased. Further, by utilizing a dry-distilled gas obtained by dry-distillation of an organic waste or biomass resource as the organic gas for allowing an organic compound to adhere to a porous ore, the organic waste or biomass resource can be utilized effectively, and consumption of fossil resources necessary in the process of iron and steel manufacturing can be suppressed.

In the embodiment of this example, an ore containing iron oxide is used as a subject to be treated in the present invention, however, the present invention is not limited to this and, the ore as a subject to be treated in the present invention may also be an ore containing an oxide of a useful element other than iron. For example, in the present invention, an ore containing an oxide of at least one element among Al, Si, Ti, Cr, Mn, Ni, Pb, W, V, Nb and Mo may also be a subject to be treated. By performing the ore treating method of the present invention also for ores containing these useful elements, a porous ore adhered with an organic compound or a porous ore containing a reduced oxide can be generated. In smelting of Al, Si, Ti, Cr, Mn, Ni, Pb, W, V, Nb and Mo, an ore after treatment can be utilized as a raw material to decrease the amount of consumption of a reducing agent and energy necessary for smelting.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An ore treating method comprising:
    forming a porous ore by heating an ore containing bond water to dehydrate the bond water in the form of water vapor, thereby forming the porous ore that contains an oxide of at least one element, and has a pore with single nanometer diameter, wherein the pore of the porous ore is surrounded and defined by an inner wall,
    forcing an organic liquid or organic gas into contact with the porous ore, wherein a temperature of the porous ore is kept lower than a temperature of the organic liquid or organic gas during the forcing step, and wherein the organic liquid or the organic gas contains an organic compound with a molecule size that is in an order of sub-nanometer smaller by one digit than the single nanometer diameter of the pore of the porous ore, and
    adhering said organic compound to the inner wall surrounding and defining the pore of said porous ore by contact of said organic compound to the inner wall surrounding and defining the pore of the porous ore.

2. The ore treating method according to claim 1, further comprising dry-distilling an organic substance to produce said organic gas.

3. The ore treating method according to claim 1, further comprising heating said porous ore adhered with an organic compound in a temperature range of 500° C. or higher, to reduce the oxide contained in said porous ore.

4. The ore treating method according to claim 1, wherein said porous ore contains an oxide of iron.

5. The ore treating method according to claim 1, wherein said porous ore contains an oxide of at least one element among Al, Si, Ti, Cr, Mn, Ni, Pb, W, V, Nb and Mo.

* * * * *